United States Patent [19]

DeWolfe et al.

[11] 4,182,985
[45] Jan. 8, 1980

[54] MAGNETORESISTOR BRIDGE PROBE FOR LOCATING THE POSITION OF A MAGNETIC TUBE SUPPORT SHEET OF A NONMAGNETIC HEAT EXCHANGE CONDUIT

[75] Inventors: Douglas DeWolfe, East Syracuse; Richard A. Sturley, Kirkville; Francis E. McPhilmy, Chittenango, all of N.Y.

[73] Assignee: Carrier Corporation, Syracuse, N.Y.

[21] Appl. No.: 896,402

[22] Filed: Apr. 14, 1978

[51] Int. Cl.² .............................................. G01R 33/12
[52] U.S. Cl. .................................. 324/220; 324/208; 324/235
[58] Field of Search ............... 324/207, 208, 219–221, 324/235, 251, 252; 338/32 R, 32 H; 323/94 H

[56] References Cited

U.S. PATENT DOCUMENTS

| 3,088,068 | 4/1963 | Hall, Jr. et al. | 324/221 |
| 3,234,455 | 2/1966 | Idel | 324/220 |
| 3,846,697 | 11/1974 | Cila et al. | 324/208 |
| 3,934,160 | 1/1976 | Borcke | 323/94 H |
| 4,041,371 | 8/1977 | Hini | 324/208 |

Primary Examiner—Robert J. Corcoran
Attorney, Agent, or Firm—J. Raymond Curtin; Barry E. Deutsch

[57] ABSTRACT

Apparatus for locating the position of at least one magnetic member relative to a nonmagnetic member includes a probe assembly movably disposed within the nonmagnetic member and including a nonmagnetic head having a pair of spaced permanent magnets mounted thereon. Each magnet has a variable resistor connected thereto, the resistance of each resistor varying directly with the strength of the flux field emanating from each magnet. The resistors are connected to a source of electrical energy for providing an electrical control signal, the magnitude of which varies in response to the movement of the probe assembly including the magnets and resistors relative to the magnetic member.

1 Claim, 2 Drawing Figures

MAGNETORESISTOR BRIDGE PROBE FOR LOCATING THE POSITION OF A MAGNETIC TUBE SUPPORT SHEET OF A NONMAGNETIC HEAT EXCHANGE CONDUIT

BACKGROUND OF THE INVENTION

This invention relates to apparatus for locating the position of a magnetic member relative to a nonmagnetic member, and in particular to such apparatus which is both portable and may be suitably employed in relatively confined spaces.

There are many applications in which it is extremely important to accurately fix the position of a magnetic member relative to a nonmagnetic member. For example, heat exchange apparatus typically includes nonmagnetic heat exchanger tubes extending between and supported by magnetic tube support sheets. The tubes are very often mechanically expanded into contact with the holes of the support sheet to firmly connect the outer surface of the tube to the inner surface of the hole of the support sheet. Mechanical expanders are employed to expand the tubes in the desired manner. In order to prevent damage to the tubes and to insure that the desired mechanical bond between the tubes and the surrounding support sheet is properly formed, it is extremely desirable that exact location of the magnetic support sheet relative to the nonmagnetic tubes is accurately fixed.

As may be readily recognized, the exact position of the tube support sheets relative to the tube is difficult to obtain as the tubes and support sheet are located within the housing of the heat exchange apparatus. Thus, some suitable means must be employed to accurately locate the position of the support sheet relative to the tubes.

Various devices have heretofore been employed in an attempt to locate an otherwise inaccessible or hidden magnetic member relative to a nonmagnetic member. Such prior art devices are disclosed in U.S. Pat. Nos. 2,768,684; 3,017,621; and 3,649,450. While each of these patents disclose various means for achieving the desired end, none of the patents utilize the field generated by a permanent magnet for locating the position of the magnetic member relative to a nonmagnetic member. In addition, each of the prior art devices are relatively large making them unsuitable for use in relatively small spaces, as for example small diameter tubes.

SUMMARY OF THE INVENTION

It is accordingly an object of this invention to provide an apparatus which may accurately fix the position of a magnetic member relative to a nonmagnetic member.

It is a further object of this invention to utilize the field generated by a permanent magnet to accurately locate the position of a magnetic member relative to a nonmagnetic member.

It is still yet another object of this invention to monitor the field generated by a permanent magnet by magneto resistors.

It is yet another object of this invention to provide a probe assembly for locating a magnetic member relative to a nonmagnetic member which is compact and thus may be satisfactorily employed in combination with relatively small diameter tubes of the heat exchange apparatus.

These and other objects of the present invention are attained in apparatus for locating the position of a magnetic member relative to a nonmagnetic member including a probe assembly movably disposed with respect to the magnetic member and having a nonmagnetic head having a pair of spaced permanent magnets mounted thereon. Each magnet has a variable resistor connected thereto, the resistance of each resistor varying directly with the strength of the flux field emanating from the magnet. The variable resistors are connected to a source of electrical energy for providing an electric control signal, the magnitude thereof varying in response to the movement of the probe assembly including the magnets and resistors relative to the magnetic member.

DESCRIPTION OF THE PREFERRED EMBODIMENTS

Figure 1:
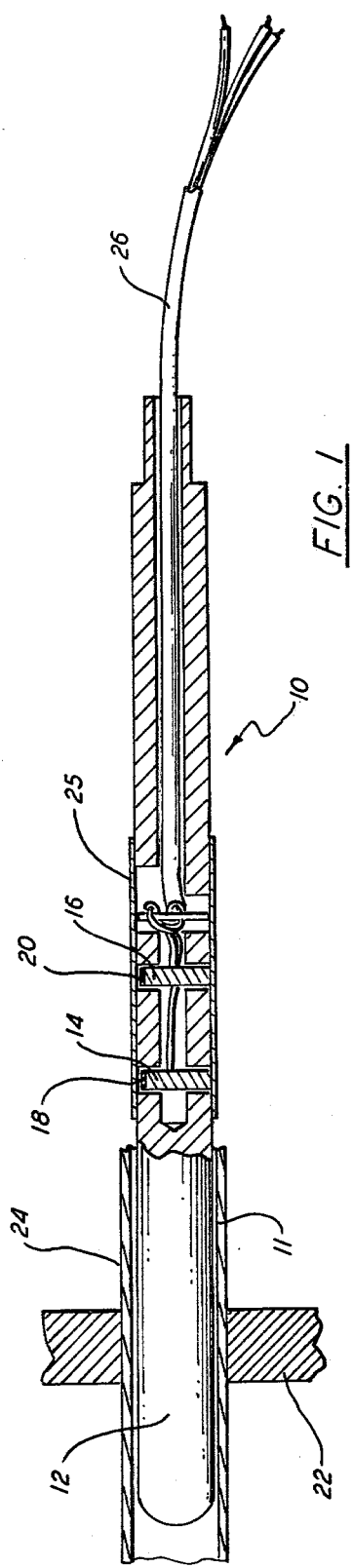
FIG. 1 is a longitudinal cross-sectional view of the apparatus of the present invention as it is employed in a typical application.

Referring now to the drawing, there is disclosed a preferred embodiment of the present application as employed to locate a magnetic tube support sheet relative to a nonmagnetic heat exchange conduit. However, it should be understood that the apparatus of the present invention may be otherwise suitably employed in other applications where it is desired to accurately fix the position of a magnetic member relative to a nonmagnetic member.

The apparatus 10 includes a probe assembly 11 having a nonmagnetic head 12. The head may be formed from plastic or brass or any other suitable nonmagnetic material. When employed to fix the location of a tube support sheet 22 relative to a heat exchange conduit 24, the probe assembly 11 is movably disposed within the heat exchange conduit.

The probe assembly 11 further includes a pair of spaced permanent magnets 14,16 each of which has respectively mounted thereon and fixed thereto a variable resistor 18,20. The variable resistors are preferably of the type known as magneto resistors which are semiconductors having the characteristic that the resistance thereof will increase in the presence of a magnetic field. In effect, the stronger the magnetic field, the larger the resulting resistance of devices 18, 20. In the preferred embodiment, the magneto resistors were obtained from the Siemens Corporation and have the Model No. Q65017-L200J. The magneto resistors are connected by electrical conduit 26 to an electrical circuit to be more fully described hereinafter. When the wiring is completed, the exposed sensors 18, 20 and conductor cable 26 are covered with a protective metal sheet 25.

In forming the probe assembly, the two small magnets 14,16 are initially demagnetized and pressed into a hole formed in probe head 12. Variable resistors 18, 20 are then secured to the magnets 14, 16 by suitable means and are connected directly, as by means of solder, to conductor cable 26. After sheet 25 is secured to the assembly, all internal voids are filled with epoxy or other suitable material. The assembly is thereafter subjected to a very strong magnetic field to permanently magnetize magnets 14 and 16.

Figure 2:
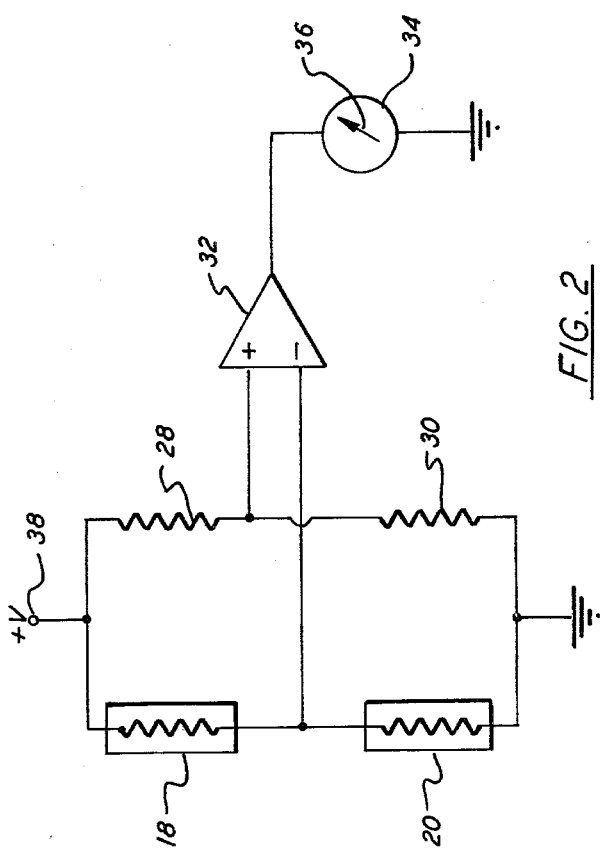
FIG. 2 is a schematic illustration of a control system suitable for use with the apparatus illustrated in FIG. 1.

Referring now to FIG. 2, there is disclosed a schematic form of a control circuit suitable for use with the probe assembly illustrated in FIG. 1 by which the position of a magnetic member relative to a nonmagnetic member may be accurately ascertained.

Magneto resistors 18 and 20 respectively form two legs of a standard bridge circuit, with the other legs being formed by fixed resistors 28 and 30. The circuit is connected to a suitable source of electrical power 38 which may be a nine volt transistor battery. The bridge circuit is connected to an amplifier 32 which is connected through suitable electrical conductors to a meter 34 having a pointer 36 movably positioned thereon.

In operation, as the probe head moves toward magnetic support sheet 22, the magnetic field of magnet 14 will increase thereby increasing the resistance of resistor 18. This will cause an unbalance in the bridge circuit causing the pointer 36 to deflect in a first direction relative to the midpoint of the meter 34. As the probe assembly continues to move relative to the tube support sheet 22, the resistor 18 and magnet 14 will move past the support sheet whence resistor 20 and magnet 16 are in closer proximity to the support sheet when compared to the first resistor 18 and magnet 14. This will cause an unbalance of the bridge circuit in the other direction since the resistance of resistor 20 will be greater than the resistance of resistor 18. The electrical control signal thus generated as a result of the unbalance will cause the pointer 36 of meter 34 to deflect in the other direction past the midpoint. The pointer on meter 34 may be replaced by lights which will be selectively lit in accordance with the position of the probe head relative to the magnetic member.

An operator can monitor the movement of the pointer in response to movement of the probe head and thus move the probe assembly so magnets 14 and 16 are spaced equidistant relative to the support sheet whereby the resistance of resistors 18 and 20 will be of equal value. When this has occurred, the pointer 36 of meter 34 will be at the midpoint of the meter scale. The operator can thus accurately fix the position of the magnetic support sheet relative to the nonmagnetic heat exchange conduit.

As the probe assembly is relatively compact due to the utilization of comparatively small permanent magnets and magneto resistors, the present invention may be particularly used in applications having relatively small confines, as for example the specific application illustrated wherein relatively small diameter conduits are supported by tube support sheets within the heat exchange apparatus. The probe assembly can be reduced in size to move within the narrow confines of the small diameter tubes.

The operator, once he has determined the exact location of the tube support sheet, can then scribe a mark on the probe head or otherwise identify the sheet's location and insert an expander into the tube to expand the tube into mechanical engagement with the support sheet. As an alternative, the probe assembly may be formed integral with an expander such that the probe assembly does not have to be removed once the position of the tube support sheet is ascertained, but rather may be moved forward and the expanding element of the combination unit be brought into contact with the tube support sheet to achieve the desired expansion of the tube for mechanical bonding of the tube and sheet.

While a preferred embodiment of the present invention has been described and illustrated, the invention should not be limited thereto, but may be otherwise embodied within the scope of the following claims.

We claim:

1. Apparatus for locating the position of a magnetic tube support sheet relative to a nonmagnetic heat exchange conduit comprising:

a source of electrical energy;

a probe assembly axially movable within said heat exchange conduit relative to said magnetic tube support sheet, and including a nonmagnetic head having a pair of axially spaced permanent magnets mounted thereon, with each magnet having a variable resistor connected thereto, the resistance of each resistor varying directly with the strength of the flux field emanating from each magnet, each resistor being connected together in a bridge circuit to said source of electrical energy for providing an electrical control signal the magnitude of said control signal varying in response to axial movement of said probe assembly including said magnets and said resistors relative to said magnetic tube support sheet; and monitoring means for receiving said control signal and providing readout means for indicating the position of said tube support sheet relative to said heat exchange conduit, said monitoring means including a meter having a pointer movable in a first direction when the probe assembly is axially moved for locating a first one of said resistors in relatively close proximity to said tube support sheet and movable in an opposite direction when the probe assembly is further axially moved for locating the other of said resistors in relatively close proximity to said tube support sheet, said pointer being located at the center of said meter when said resistors are spaced equidistant from said tube support sheet.

* * * * *